US007595016B2

(12) United States Patent
Hiraoka et al.

(10) Patent No.: US 7,595,016 B2
(45) Date of Patent: Sep. 29, 2009

(54) METHOD FOR MANUFACTURING GOLF BALL

(75) Inventors: Hidenori Hiraoka, Kobe (JP); Koichi Fujisawa, Kobe (JP)

(73) Assignee: SRI Sports Limited, Kobe (JP)

( * ) Notice: Subject to any disclaimer, the term of this patent is extended or adjusted under 35 U.S.C. 154(b) by 890 days.

(21) Appl. No.: 10/900,269

(22) Filed: Jul. 28, 2004

(65) Prior Publication Data

US 2005/0056964 A1 Mar. 17, 2005

(30) Foreign Application Priority Data

Sep. 12, 2003 (JP) ............................ 2003-322111

(51) Int. Cl.
*B28B 5/00* (2006.01)
*B28B 7/22* (2006.01)
*A63B 37/04* (2006.01)

(52) U.S. Cl. ...................... 264/250; 264/255; 473/372; 473/373

(58) Field of Classification Search ................. 264/255, 264/250; 473/372, 373
See application file for complete search history.

(56) References Cited

U.S. PATENT DOCUMENTS 6,126,560 A * 10/2000 Maruoka et al. ............ 473/409
2003/0073512 A1* 4/2003 Kim .......................... 473/351

FOREIGN PATENT DOCUMENTS

| | | | |
|---|---|---|---|
| JP | 47-9257 | | 3/1972 |
| JP | 2001-187171 | A | 7/2001 |
| JP | 2002-58756 | A | 2/2002 |
| JP | A-2003-159352 | | 6/2003 |
| JP | 2003-525649 | A | 9/2003 |

* cited by examiner

*Primary Examiner*—Philip C Tucker
*Assistant Examiner*—Michael N Orlando
(74) *Attorney, Agent, or Firm*—Birch, Stewart, Kolasch & Birch, LLP

(57) ABSTRACT

A method for manufacturing a golf ball by forming half shell covers using a rubber composition and forming golf ball covers using the half shell covers. The adhesion strength between the bonding surfaces of half shells (durability of golf balls) is improved by keeping the shape of half shells and the thickness of the resulting covers uniform. The adhesion strength between the bonding surfaces of half shells is further increased by using a composition containing a crystalline rubber as the rubber composition for cover; molding the rubber composition at a particular temperature while preserving the shape of the half shells without crosslinking or with only partially crosslinking the rubber component; and forming the half shells into a cover while crosslinking the rubber components.

12 Claims, 1 Drawing Sheet

PRESS MOLDING
5a
5b
6a
6b
1
2
3
4
R1
R2

METHOD FOR MANUFACTURING GOLF BALL

This Non-provisional application claims priority under 35 U.S.C. § 119(a) on Patent Application No(s). 2003-322111 filed in Japan on Sep. 12, 2003, the entire contents of which are hereby incorporated by reference.

TECHNICAL FIELD

The present invention relates to a method for manufacturing a golf ball, and in particular to a method for manufacturing a golf ball having a rubber cover.

BACKGROUND ART

There are many requirements for the cover of a golf ball, for example, abrasion resistance of keeping the ball surface from becoming fluffy by the friction caused by hitting clubs or on grounding, shot feeling, high controllability of approach shot, flight characteristics or rebound characteristics, durability, and the like. Balata cover, ionomer cover, urethane cover, and the like have been known and used as the cover of a golf ball.

Thread-wound golf balls having a balata cover or rubber cover are known to be excellent in shot feeling and controllability, but inferior in durability and more expensive. Accordingly, ionomer cover and urethane cover have been proposed as a cover for replacing the balata cover. It is often pointed out that golf balls having an ionomer cover are superior in durability but rather poor in shot feeling and controllability. Alternatively, golf balls having a urethane cover are better in shot feeling and controllability than golf balls having an ionomer cover, but slightly lower in durability. As described above, although many covers were proposed for improving the properties of golf-ball covers, completely satisfactory golf balls are currently not available.

In particular, numerous golf balls having ionomer cover or urethane cover have been proposed recently. However, a smaller number of improvements have been proposed with respect to golf balls having a rubber cover, for example, by U.S. Patent Application Publication No. 2003/0073512A1.

Injection molding of golf balls where a rubber composition is injection-molded around a core, for example, has been known as the method for manufacturing golf balls having a rubber cover. However, the golf balls produced by an injection molding method tend to have lower abrasion resistance due to the orientation of the rubber flowing in the mold during injection molding.

On the other hand, the method for producing golf balls by forming half-shell covers using a rubber composition and press-molding a core covered by two half shells has a disadvantage that unless the rubber composition is previously crosslinked to some degree, it is difficult to keep the shape of half shells and the thickness of the resulting cover layer uniform, leading to decrease in durability of the covers. If the rubber composition is crosslinked excessively for preserving the shape of half shells, the adhesion strength between the bonding surfaces of two half shells (adhesion surfaces) declines, leading to defects in half-shell bonding. Consequently, the durability of the resulting cover also declines.

SUMMARY OF THE INVENTION

The present invention has been achieved in view of the above problems. An object of the present invention is to provide a method for manufacturing a golf ball which is free from the problems residing in the prior art.

Another object of the present invention is to provide a method for manufacturing a golf ball which can improve the adhesion strength between a bonding surfaces of half shells or the durability of a golf ball with the shape of half shells and the thickness of the resulting covers being uniform.

According to an aspect of the present invention, a core having one or more layers is prepared. A rubber composition is prepared by mixing an organic peroxide in a range of more than 0.3 part by weight to 7.5 or less parts by weight with 100 parts by weight of a rubber component including a crystalline rubber. Uncrosslinked or partially crosslinked half shells are formed by molding the rubber composition at a temperature of 10 to 40° C. lower than the one-hour-half-life temperature of the organic peroxide. Two half shells are placed over the core, and heat-molded into a cover.

These and other objects, features, aspects, and advantages of the present invention will become more apparent from the following detailed description of the preferred embodiments/examples with reference to the accompanying drawing.

DETAILED DESCRIPTION OF THE PREFERRED EMBODIMENTS OF THE INVENTION

Figures 1A, 1B, 1C, 1D, 1E, 1F:
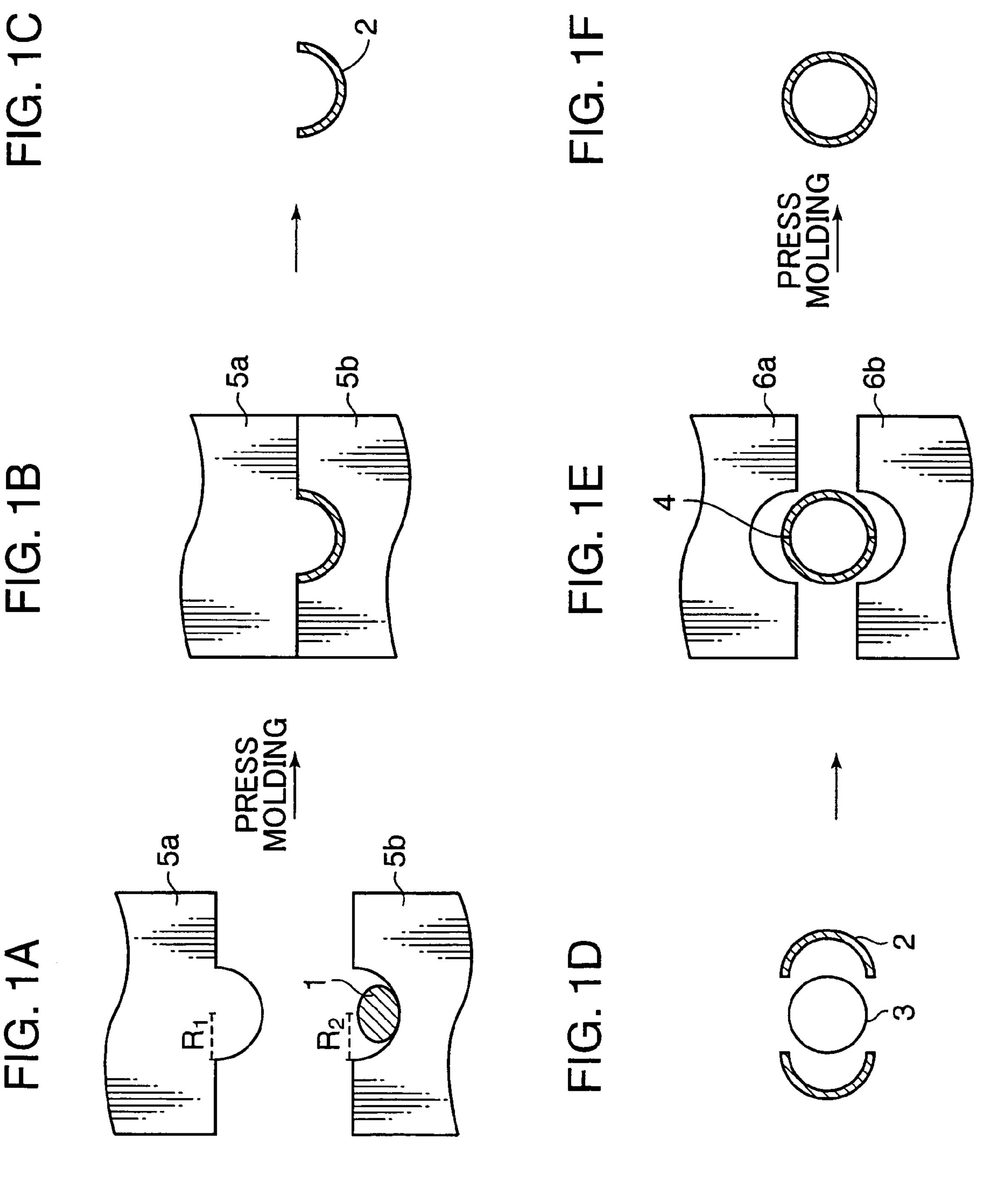
FIGS. 1A to 1F combinedly show a sequence of steps of a golf ball manufacturing method embodying the present invention.

A method for manufacturing a golf ball according to the present invention comprises the steps of: forming a core having one or more layers; preparing a rubber composition for cover by mixing more than 0.3 part by weight to 7.5 or less parts by weight of an organic peroxide with 100 parts by weight of a rubber component containing a crystalline rubber; forming uncrosslinked or partially crosslinked half shells by molding the rubber composition at a temperature of 10 to 40° C. lower than the one-hour-half-life temperature of the organic peroxide; and sandwiching the core between two thus-formed half shells, and heat-molding the resulting composite to render the half shells into a cover covering the core.

The present invention is characterized in that the adhesion strength between bonding surfaces of half shells is further increased by using a composition containing a crystalline rubber as the cover rubber composition; molding the rubber composition at a particular temperature while preserving the shape of the half shells without crosslinking or with only partially crosslinking the rubber component; and rendering the half shells into a cover while crosslinking the rubber components.

Use of the crystalline rubber is because it is quite effective in preserving the shape of half shells and allows preservation of the shape of half shells even when the crosslinking degree of the rubber components is lower. Further, the rubber composition for cover is molded at a temperature of 10 to 40° C. lower than the one-hour-half-life temperature of the organic peroxide to form uncrosslinked or partially crosslinked half shells. Specifically, the difference in temperature between one-hour-half-life temperature (Ta) of the organic peroxide and the molding temperature (Th) of the half shells, Th (=Ta−Th), is 10° C. or more to 40° C. or less. As organic peroxides generally have different half-life temperatures respectively, it is difficult to adjust the crosslinking degree of the rubber compositions for cover only by controlling the molding temperature. However, if the difference between the half-life temperature of organic peroxide and the molding temperature is controlled in the particular range as described above, it is possible to adjust the crosslinking degree of the rubber compositions for cover, independent of the half-life temperatures of respective organic peroxides. In the present invention, the one-hour-half-life temperature of organic peroxides are adopted, because the period of molding half shells is practically about 3 minutes, or about 20 minutes including the cooling period, and thus the half life in about 1 minute is too short, while that in 10 hours is too long.

In another preferable embodiment of the present invention, a rubber component containing a crystalline rubber and a noncrystalline rubber is used. Combined use with the noncrystalline rubber can further improve the durability of the resulting golf balls. The crystalline rubbers are, for example, trans-polyisoprenes and 1,2-syndiotactic polybutadienes. In still another preferable embodiment, the rubber composition for cover is press-molded for 3 to 10 minutes for providing uncrosslinked or partially crosslinked half shells. In still another preferred embodiment, the half shells are press-molded at 140 to 180° C. for 5 to 20 minutes for production of covers. Press molding under these conditions allows enhancement of the crosslinking of rubber components and thus further increase of the adhesion strength between the bonding surfaces of half shells.

The inventive manufacturing method provides a rubber half shell which is excellent in the shape stability. The use of such half shells assures a golf ball which is excellent in the abrasion resistance, the durability, the rebound characteristics, and the controllability.

Next, the inventive manufacturing method will be described in detail.

(1) Preparation of Core Having One or More Layers:

The step of forming a core having one or more layers will be described. A single-layered, multilayered, or thread-wound core or the like may be used as the core having one or more layers. Use of a single-layered or multilayered core allows production of two-piece, three-piece, or higher multi-piece golf balls, and use of a thread-wound core allows production of thread-wound golf balls.

A conventional manner of forming a golf ball core may be used for forming the core having one or more layers according to the present invention. A specific manner of forming the core having one or more layers will be described, taking a case of forming a single-layered core as an example. In a preferred embodiment of forming a single-layered core, a core rubber composition containing a base rubber, a cocrosslinking agent, an organic peroxide, and a filler is, for example, heat-press molded.

Examples of base rubber include natural and/or synthetic rubbers, and more specifically polybutadiene rubbers, natural rubbers, polyisoprene rubbers, styrene polybutadiene rubbers, ethylene-propylene-diene rubbers (EPDMs) and the like. Among them, particularly preferable are high-cis content polybutadienes containing 40% or more, preferably 70% or more, more preferably 90% or more cis bonds, which are advantageous for repulsion.

An a,β-unsaturated carboxylic acid having 3 to 8 carbons or a metal salt thereof may be used as the cocrosslinking agent. The metals constituting the metal salts include zinc, magnesium, calcium, aluminum, and sodium, and the use of zinc is preferable, as it allows increase in the rebound characteristics of resulting golf balls. Preferred examples of the a,β-unsaturated carboxylic acids or the metal salts thereof include acrylic acid, methacrylic acid, zinc acrylate, and zinc methacrylate. The amount of the cocrosslinking agent used is preferably 10 or more parts by weight, more preferably 20 or more parts by weight to 50 or less parts by weight, more preferably 40 or less parts by weight with respect to 100 parts by weight of the rubber components. When the amount of the cocrosslinking agent used is less than 10 parts by weight, it is necessary to increase the amount of the organic peroxide used for securing the suitable hardness, leading to decrease in the rebound characteristics of resulting golf balls. On the contrary, when the amount of the cocrosslinking agent used is over 50 parts by weight, the resulting core may become too hard, leading to deterioration in shot feeling.

Examples of organic peroxides contained in the core rubber composition include organic peroxides such as dicumyl peroxide, 1,1-bis(t-butylperoxy)-3,5-trimethylcyclohexane, 2,5-dimethyl-2,5-di(t-butylperoxy)hexane, di-t-butyl peroxide, and the like, and among them, dicumyl peroxide is favorably used. The amount of organic peroxide blended is preferably 0.2 to 3 parts by weight, and more preferably 0.3 to 2 parts by weight with respect to 100 parts by weight of the base rubber. A mixing ratio of less than 0.2 part by weight may lead to an excessively softer core and to decrease in the rebound characteristics of the resulting golf ball, and when the mixing ratio is more than 3 parts by weight, it is necessary to increase the amount of the cocrosslinking agent used for securing the suitable hardness, leading to decrease in the rebound characteristics of the resulting golf balls.

Examples of fillers contained in the core rubber composition include inorganic fillers such as zinc oxide, barium sulfate, calcium carbonate, magnesium oxide, tungsten powder, molybdenum powder, and the like. The amount of the filler blended is preferably 2 or more parts by weight, more preferably 3 or more parts by weight to 50 or less parts by weight, more preferably 35 or less parts by weight with respect to 100 parts by weight of the base rubber. When the amount of the filler blended is less than 2 parts by weight, it becomes difficult to adjust the weight. When the amount is over 50 parts by weight, the weight proportion of the rubber components declines, which leads to decrease the rebound characteristics of the resulting golf balls.

In addition to the base rubber, cocrosslinking agent, organic peroxide, and filler, the core rubber composition may further contain an organic sulfur compound, an antioxidant, a peptiser, or the like arbitrarily. The amount of the antioxidant blended is preferably 0.1 part by weight or more to 1 part by weight or less with respect to 100 parts by weight of the base rubber. Further, the peptiser is preferably contained in an amount of 0.1 part by weight or more to 5 or less parts by weight with respect to 100 parts by weight of the base rubber.

The press-molding condition of the core rubber composition may be selected properly according to the rubber composition, but the rubber compositions are usually heated at 130 to 200° C. for 10 to 60 minutes, or heated in two steps at 130 to 150° C. for 20 to 40 minutes and then at 160 to 180° C. for 5 to 15 minutes.

A single-layered core is described as a preferable example, but a thread-wound core may be used, for example, for producing thread-wound golf balls, and a multilayered core, for producing multi-piece (three-piece or more) golf balls.

The thread-wound core above consists of a center and a thread rubber layer formed by winding thread rubbers around the center in a stretched state, and any center or thread rubber known in the art may be used for the core. Either a liquid-based center (liquid center) or rubber-based center (solid center) may be used as the center. Thread rubbers similar to those conventionally used for the thread layer of thread-wound golf balls may be used as the thread rubber to be wound around the center above, and a specific example thereof is a thread rubber obtained by vulcanizing a rubber composition containing a natural or natural rubber and synthetic polyisoprene, sulfur, a vulcanization aid, a vulcanization accelerator, an antioxidant, and the like.

Thread-wound cores are prepared by winding the thread rubbers around the center while stretching the rubbers by about 10 times. The multilayered core consists of a center (core portion) and at least one layer covering the center, and the center may be prepared in the similar manner to the method for forming the single-layered core described above. The "at least one layer" (hereinafter, referred simply as an "intermediate layer") covering the center above may contain for example, a thermoplastic elastomer such as a thermoplastic ionomer resin, thermoplastic polyurethane elastomer, thermoplastic polyamide elastomer, thermoplastic polyester elastomer, or the like; a diene block copolymer; or the like; or a mixture containing at least two or more kinds of these polymers.

The thermoplastic ionomer resins include thermoplastic ionomer resins conventionally used as the cover material for golf balls: for example, copolymers from ethylene and an a,β-unsaturated carboxylic acid, at least part of the carboxyl groups thereof being neutralized with a metal ion; ternary copolymers from ethylene, an a,β-unsaturated carboxylic acid, and an a,β-unsaturated carboxylic esters, at least part of the carboxyl groups thereof are neutralized with a metal ion; and the like.

The metal ions for neutralization include monovalent metal ions such as sodium, potassium, and lithium ions, and the like; bivalent metal ions such as zinc, calcium, magnesium, copper, and manganese ions and the like; trivalent metal ions such as aluminum and neodymium ions; and the like, and in particular a zinc ion is preferable as it forms the agglomerate of metal ions higher in mutual binding force and thus suppresses decrease in mechanical strength due to dispersion of the crosslinked diene rubber particles. Typical examples of the ionomer resins include Himilan 1605 (trademark of a sodium ion-neutralized ethylene-methacrylic acid copolymer-based ionomer resin), Himilan 1707 (trademark of a sodium ion-neutralized ethylene-methacrylic acid copolymer-based ionomer resin), Himilan 1706 (trademark of a zinc ion-neutralized ethylene-methacrylic acid copolymer-based ionomer resin), Himilan AM7315 (trademark of a zinc ion-neutralized ethylene-methacrylic acid copolymer-based ionomer resin), Himilan AM7317 (trademark of a zinc ion-neutralized ethylene-methacrylic acid copolymer-based ionomer resin), Himilan 1555 (trademark of a sodium ion-neutralized ethylene-methacrylic acid copolymer-based ionomer resin), and Himilan 1557 (trademark of a zinc ion-neutralized ethylene-methacrylic acid copolymer-based ionomer resin), manufactured by Du Pont-Mitsui Polychemicals Co., Ltd.; IOTEK 8000 (trademark of a sodium ion-neutralized ethylene-methacrylic acid copolymer-based ionomer resin), and IOTEK 7010 (trademark of a zinc ion-neutralized ethylene-methacrylic acid copolymer-based ionomer resin), manufactured by Exxon Chemical Company; Surlyn 7930 (trademark of a lithium ion-neutralized ethylene-methacrylic acid copolymer-based ionomer resin), Surlyn 9945 (trademark of a zinc ion-neutralized ethylene-methacrylic acid copolymer-based ionomer resin), and Surlyn 8945 (trademark of a sodium ion-neutralized ethylene-methacrylic acid copolymer-based ionomer resin) manufactured by E.I. Du Pont de Nemours and Company; and the like.

Typical examples of thermoplastic elastomers include thermoplastic polyamide elastomers sold from Toray Industries, Inc. by a trademark of "Pebax" (e.g., "Pebax 2533"); thermoplastic polyester elastomers sold from Du Pont-Toray Co., Ltd. by a trademark of "Hytrel" (e.g., "Hytrel 3548", "Hytrel 4047"); thermoplastic polyurethane elastomers sold from BASF Japan Ltd., by a trademark of "Elastolan" (e.g., "Elastolan ET880"); and the like.

The diene block copolymers described above are block copolymers or partially hydrogenated block copolymers having double bonds derived from conjugated diene compounds. Preferred examples of the diene block copolymers include block copolymers having a SBS (styrene-butadiene-styrene) structure that have polybutadiene blocks containing an epoxy group, or block copolymers having a SIS (styrene-isoprene-styrene) structure containing an epoxy group, and the like. Typical examples of the diene block copolymers include "Epofriend A1010" manufactured by Daicel Chemical Industries, Ltd.; "Septon HG-252" manufactured by Kuraray Co., Ltd.; and the like.

The intermediate layers above may additionally contain a density adjuster such as barium sulfate, tungsten or the like, an antioxidant, a pigment, or the like. The method of forming the intermediate layer is not particularly limited, but examples thereof are methods of: previously forming a material for the intermediate layer into a hemispherical half shell and press molding the solid center covered with two shells; and injection molding the material for intermediate layer directly on the surface of the solid center and covering the solid center with the material.

(2) Preparation of Rubber Composition for Cover

The step of preparing a rubber composition for cover according to the present invention will be described. The preparation method of the rubber composition for cover is not particularly limited as far as a rubber composition for cover is prepared by mixing more than 0.3 part by weight and 7.5 or less parts by weight of an organic peroxide to 100 parts by weight of a rubber component containing a crystalline rubber. In a preferred embodiment, in addition to the rubber component and the organic peroxide, the rubber composition for cover contains, for example, a cocrosslinking agent, a pigment component such as zinc oxide, titanium oxide and a blue pigment, a density adjuster, a dispersant, an antioxidant, a UV absorbent, a photostabilizer, a fluorescent material or fluorescent brightener, or the like, if needed, in an amount in the range wherein the additives do not damage the properties of cover.

The crystalline rubber used in the present invention is quite effective in securing the shape stability of half shells. The "crystalline rubber" is generally a rubber that has portions wherein the rubber chains are aligned regularly and are packed closely to each other, which for example crystallizes when stretched easily even at room temperature and returns to the original state when relaxed due to melting of the crystal formed. Further, the "shape stability of half shell" means that once formed, the half shells do not change in shape at all practically for example, by blocking or deformation, leading to irregularity in the thickness of shells.

Examples of crystalline rubbers include 1,2-syndiotactic polybutadienes, trans-polyisoprenes, nitrile rubbers, chloroprene rubbers, and the like, and use of a 1,2-syndiotactic polybutadiene or trans-polyisoprene is preferable. The trans-polyisoprenes include, for example, natural trans-polyisoprenes and synthetic trans-polyisoprenes.

The 1,2-syndiotactic polybutadienes, having the asymmetric carbons alternately having a reverse configuration, can be represented by the following Formula (1).

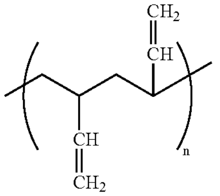

(1)

In addition, the trans-polyisoprenes can be represented by the following Formula (2).

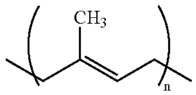

(2)

In another preferred embodiment of the present invention, a rubber component containing a crystalline rubber and a noncrystalline rubber may be used as the rubber component of the rubber composition for cover. As the noncrystalline rubber component increases the durability of the resulting cover. Examples of noncrystalline rubbers include (cis-1,4-) polybutadiene rubbers, natural rubbers, (cis)-polyisoprene rubbers, styrene polybutadiene rubbers, ethylene-propylene-diene rubbers (EPDMs), and the like, and the (cis-1,4-)polybutadiene rubbers and styrene polybutadiene rubbers are preferably used.

The content of the crystalline rubber in the rubber components is not particularly limited, but is preferably 10 weight % or more, more preferably 20 weight % or more, and still more preferably 30 weight % or more. A content of the crystalline rubber of less than 10 weight % may lead to poorer shape stability of the resulting half shells. The organic peroxide is blended to the rubber composition for cover used in the present invention, in an amount of more than 0.3 part by weight and 7.5 or less parts by weight with respect to 100 parts by weight of the rubber components. When the amount of the organic peroxide blended is 0.3 part by weight or less, the hardness of the resulting cover becomes insufficient, as will be described below. Lower cover hardness leads to deterioration in shot feeling and decrease in flight distance of the resulting golf balls due to increase in spin amount thereof. When the content of the organic peroxide blended is more than 7.5 parts by weight, the hardness of the resulting cover becomes excessively high, consequently leading to decrease in controllability due to excessively lower spin amount of the resulting golf balls. The content of the organic peroxide is preferably 0.4 part by weight or more, more preferably 0.5 part by weight or more to 6.5 or less parts by weight, more preferably 6 or less parts by weight.

The organic peroxide is not particularly limited, and examples thereof include dialkyl peroxides such as dicumyl peroxide, a,a'-bis(t-butylperoxy)diisopropylbenzene, t-butylcumyl peroxide, 2,5-dimethyl-2,5-bis(t-butylperoxy)hexane, 2,5-dimethyl-2,5-bis(t-butylperoxy)hexyne, di-t-butyl peroxide, and the like; peroxy ketals such as 1,1-di(t-hexylperoxy)cyclohexane, 1,1-di(t-butylperoxy)cyclohexane, 1,1-bis(t-hexylperoxy)-3,3,5-trimethylcyclohexane, 1,1-bis(t-butylperoxy)-3,3,5-trimethylcyclohexane, n-butyl 4,4'-bis(t-butylperoxy)valeate, 1,1-di(t-butylperoxy)-2-methylcyclohexane, and the like; diacyl peroxides such as benzoyl peroxide, benzoyl m-methylbenzoyl peroxide, m-toluyl peroxide, di(4-methylbenzoyl)peroxide, and the like; and organic peroxides including peroxyesters such as 2,5-dimethyl-2,5-di(benzoylperoxy)hexane, t-hexylperoxy benzoate, t-butylperoxy benzoate, t-butylperoxy-3-methylbenzoate, and the like, and among them, a dialkyl peroxide, more preferably dicumyl peroxide or di-t-butyl peroxide is used preferably.

In the present invention, an a,β-unsaturated carboxylic acid having 3 to 8 carbons or a metal salt thereof may be used as the cocrosslinking agent which may be additionally contained in the rubber composition for cover. The metals constituting the metal salts include zinc, magnesium, calcium, aluminum, sodium, and the like, and use of zinc is preferable as it increases the rebound characteristics of the resulting golf balls. Preferred examples of a,β-unsaturated carboxylic acids or the metal salts thereof include acrylic acid, methacrylic acid, zinc acrylate, and zinc methacrylate. The amount of the cocrosslinking agent used is preferably 15 or more parts by weight, more preferably 20 or more parts by weight to 40 or less parts by weight, more preferably 35 or less parts by weight with respect to 100 parts by weight of the rubber components. When the amount of the cocrosslinking agent used is less than 15 parts by weight, it is necessary to increase the amount of the organic peroxide used for securing the suitable hardness, leading to decrease in the rebound characteristics of resulting golf balls. On the contrary, when the amount of the cocrosslinking agent used is over 45 parts by weight, the resulting core may become too hard, leading to deterioration of the shot feeling.

In yet another embodiment of the present invention, use of titanium oxide as the pigment component for the rubber composition for cover is also preferable, as it provides the cover in color. The amount of titanium oxide blended is preferably 1 part by weight or more, preferably 2 or more parts by weight to 10 or less parts by weight, preferably 8 or less parts by weight with respect to 100 parts by weight of rubber components. A content of less than 1 part by weight leads to decrease in the opacifying effect and increase in the transparency of the cover, while a content of over 10 parts by weight, to decrease in the shot feeling and the rebound characteristics of the resulting golf balls. In another preferred embodiment, use of a trace amount of a bluish pigment is preferable for providing the cover in bright white.

The density adjusters that may be additionally contained in the rubber composition for cover include inorganic fillers such as zinc oxide, barium sulfate, calcium carbonate, magnesium oxide, tungsten powder, molybdenum powder, and the like. The amount of the density adjuster blended is preferably 2 or more parts by weight, more preferably 3 or more parts by weight to 50 or less parts by weight, more preferably 35 or less parts by weight with respect to 100 parts by weight of the rubber components. When the amount of density adjuster blended is less than 2 parts by weight, it becomes difficult to adjust the weight. When the amount is over 50 parts by weight, the weight proportion of rubber components declines and leads to decrease in the rebound characteristics of the resulting golf balls. Among the inorganic fillers above, metal oxides such as zinc oxide, magnesium oxide, and the like, for example, function as a metal crosslinking agent for the a,β-unsaturated carboxylic acid described above.

In still another preferred embodiment, an antioxidant or a peptiser is blended if needed in the rubber composition for cover. The amount of the antioxidant blended is preferably 0.1 part by weight or more to 1 part by weight or less with respect to 100 parts by weight of the rubber components. Alternatively, the content of the peptiser is preferably 0.1 part by weight or more to 5 or less parts by weight with respect to 100 parts by weight of the rubber components.

The rubber composition for cover may be prepared arbitrarily by using a kneading machine such as a kneader, roll or the like, for example, by kneading the compositions except an organic peroxide in a kneader; kneading the mixture by a roll into a sheet; and then further kneading the sheet and the organic peroxide together by a roll, for example, at about 90 to 110° C. The kneading temperature after addition of the organic peroxide is preferably controlled to a temperature preferably of 10 to 40° C. lower, more preferably 15 to 35° C. lower, than the one-hour-half-life temperature of the organic peroxide, in a similar manner to the molding temperature of half shells as will be described below.

(3) Preparation of Half Shell

In the present invention, the rubber composition for cover prepared as described above is formed at a temperature of 10 to 40° C. lower than the one-hour-half-life temperature of the organic peroxide, to give a uncrosslinked or partially crosslinked half shell. Namely, the difference in temperature between the one-hour-half-life temperature (Ta) of the organic peroxide and the molding temperature (Th) of the half shell, Th (=Ta−Th), is 10° C. or more, preferably 15° C. or more to 40° C. or less, preferably 35° C. or less. At a temperature difference Th of less than 10° C., the molding temperature of half shell is so higher that excessive crosslinking of the rubber composition progresses, which in turn prohibits sufficient increase in the adhesion strength between the bonding surfaces of half shells when the cover is formed. Alternatively, a Th of over 40° C. does not allow sufficiently high shape stability of half shells, causing deformation thereof and consequently inadequate adhesion of the bonding surfaces of the half shells when the cover is formed.

In the present invention, the half life of an organic peroxide is a period of time during which the concentration of an organic peroxide decreases to half of the original value, and a temperature at which the half life of an organic peroxide is one-hour is called one-hour-half-life temperature. The one-hour-half-life temperatures of the major organic peroxides among the organic peroxides described above and the preferred temperatures for molding half shells are summarized in TABLE 1.

TABLE 1

| Organic peroxide | One-hour-half-life temperature (° C.) | Half-shell molding temperature (° C.) |
|---|---|---|
| Dicumyl peroxide | 136 | 96 to 126 |
| Di-t-butyl peroxide | 144 | 104 to 134 |
| t-Butylcumyl peroxide | 137 | 97 to 127 |
| 1,1-Di(t-hexylperoxy)cyclohexane | 107 | 67 to 97 |
| 1,1-Di(t-butylperoxy)cyclohexane | 111 | 71 to 101 |
| 1,1-Bis(t-butylperoxy)-3,3,5-trimethylcyclohexane | 106 | 66 to 96 |
| 1,1-Bis(t-hexylperoxy)-3,3,5-trimethylcyclohexane | 106 | 66 to 96 |
| 2,5-Dimethyl-2,5-di(t-butylperoxy) hexane | 138 | 98 to 128 |
| t-Butylperoxy benzoate | 125 | 85 to 115 |

In yet another preferred embodiment of the present invention, the half shells are prepared by press-molding the rubber composition for cover for 3 minutes or more, more preferably 5 minutes or more to 10 minutes or less, more preferably 8 minutes or less. A molding period of 3 minutes or more enhances the shape stability of the resulting half shell. In addition, a molding period of 10 minutes or less ensures prevention of excessive crosslinking of the rubber composition for cover when the half shells are molded.

(4) Forming of Cover

In the present invention, a golf ball cover is prepared by sandwiching the core between two half shells prepared as described above and heat molding the resulting composite. The method of heat molding is not particularly limited, but press-molding is preferable. Further, the temperature of the heat-molding is not particularly limited, but preferably, for example, 140° C. or more, more preferably 150° C. or more to 180° C. or less, more preferably 170° C. or less. The period of heat-molding is preferably 5 minutes or more, more preferably 8 minutes or more to 20 minutes or less, more preferably 18 minutes or less, at a temperature in the heating temperature range above.

The molding temperature and molding period above are chosen, because of the fact that if the rubber composition for cover is overheated during the cover molding process, the cover material may degrade, resulting in deterioration of the mechanical properties of the resulting golf balls, while if the heating is insufficient during the cover molding process, the crosslinking degree of the rubber composition for cover constituting the half shells is not adequately raised, sometimes leading to decrease in the adhesion strength between the bonding surfaces of half shells. In a preferred embodiment of the invention, the cover and dimples thereon are formed simultaneously, by using a mold having bumps corresponding to the dimples. In another preferred embodiment, the golf balls molded as described above are preferably subjected to paint finishing, marking with a stamp, and the like for improving the appearance and commercial value thereof.

Hereinafter, the present invention will be described in more detail with reference to drawings, but it should be understood that the present invention is not limited to the embodiments shown in the drawings. FIG. 1 is a schematic drawing illustrating a method for manufacturing golf balls according to the present invention.

As shown in FIGS. 1A to 1C, molding of the rubber composition for cover into the shape of half shells is conducted, for example, by placing a rubber composition 1 for cover prepared as described above in the mold 5*b* having a concave cavity and press-molding the rubber composition by using the mold 5*a* having a convex dome. At that time, the layer thickness of the half shell may be adjusted, for example, by adjusting the radius $R_2$ of the concave cavity and the radius $R_1$ of the convex dome.

Subsequently, as shown in FIGS. 1D to 1F, a core 3 separately molded is sandwiched between two half shells prepared as described above, and the composite is press-molded by using the molds 6*a* and 6*b* each having a concave cavity. Use of molds 6*a* and 6*b* having bumps for forming dimples therein allows molding of the cover and at the same time engraving dimples on the surface thereof.

(5) Properties of Golf Ball Prepared by Inventive Manufacturing Method

Golf balls thus obtained by the inventive manufacturing method have a Shore D hardness of the cover of 40 or more, more preferably 45 or more to 68 or less, and still more preferably 66 or less in a slab state. When the Shore D hardness of the cover is excessively low, the shot feeling of the resulting golf balls may decline and the spin amount thereof increases, consequently leading to decrease in flight distance. Alternatively, when the Shore D hardness of the cover is excessively high, the spin amount may decline, leading to decrease in controllability of the resulting golf balls. As described above, it is also preferable to adjust the Shore D hardness of the cover by adjusting the amount of the organic peroxide and the cocrosslinking agent blended in the rubber composition for cover.

The golf balls obtained by the inventive manufacturing method have preferably a cover thickness of 0.3 mm or more, more preferably 0.5 mm or more to 1.6 mm or less, more preferably 1.2 mm or less. When the cover is too thin, technical merits in durability, abrasion resistance, and the like may decrease drastically, while when the cover is too thick, the shot feeling and the rebound characteristics may decline.

The golf balls obtained by the inventive manufacturing method have preferably a diameter of 40 mm or more, preferably 42 mm or more to 45 mm or less, more preferably 44 mm or less. In particular, from the viewpoint of decreasing air resistance in the range satisfying the specifications of the United States Golf Association, the diameter is preferably 42.67 mm or more to 42.80 mm or less.

The golf balls obtained by the inventive manufacturing method have preferably a weight of 44 g or more, more preferably 45 g or more to 46 g or less, more preferably 45.93 g or less.

EXAMPLE

The present invention will be described in detail with reference to EXAMPLES, but it should be understood that the present invention is not limited to the following EXAMPLES and any modifications and working models within the scope of the present invention are also included in the scope of the invention. Evaluation manners are first described as follows.

(1) Rebound Characteristics

A metal or aluminum circular cylinder having a weight of 198.4 g was crashed to each golf ball at a velocity of 45 m/sec, the repulsion index of each golf ball was obtained by determining the velocities of the circular cylinder and golf ball before and after collision respectively and calculating from the velocities and the weights. Measurements are repeated 12 times for each golf ball, and the average thereof is obtained. The repulsion index is an indexed value of each golf ball with respect to 100 of the average of golf ball of No. 6. The larger the repulsion index is, the larger the rebound characteristics are.

(2) Durability

A No. 1 wood club (W#1, a driver) having a metal head was mounted to a swing robot manufactured by True Temper Co. and each golf ball was hit directly by the club at a head speed of 45 m/sec repeatedly until the golf ball is damaged. The durability is determined by measuring the number of hits until the cover of the golf ball cracks, and is expressed as an index, with the value of the index of golf ball of No. 4 being taken as 100. The larger the value is, the better durability the golf ball has.

(3) Abrasion Resistance

Each golf ball was hit at two points thereof with a commercially available pitching wedge (PW) connected to a swing robot manufactured by TRUETEMPER Co. at a head speed of 36 m/sec, and the abrasion resistance was evaluated by observing the hit portions by visual observation and classified into three levels according to the following criteria.

○: The surface of the golf ball slightly has a cut, but it is not particularly noticeable.

Δ: The surface of the golf ball clearly has a cut, and the surface becomes fluffy.

X: The surface of the golf ball is considerably chipped off, and the surface noticeably becomes fluffy.

(4) Controllability

Each golf ball was actually hit by ten advanced-level golfers with a pitching wedge (PW), and the controllability thereof was evaluated according to the following evaluation criteria, and the most frequently cited class was designated as the result of evaluation of the golf ball.

○: Easier in making a ball spin

Δ: Normal in making a ball spin

X: Difficult in making a ball spin. The ball feels like it slips.

(5) Cover Hardness or Slab Hardness

A sheet having a thickness about 2 mm was prepared by heat-pressing a cover composition, and the resulting sheet was stored at 23° C. for 2 weeks. The cover hardness of the sheet was determined, as three or more sheets are piled so that there would be no adverse effect of the measuring board, by using a spring-type Shore D hardness testing machine specified in ASTM-D2240

Next, preparation of specific golf balls will be described as follows.

(1) Preparation of Core

A core rubber composition having a composition set forth in TABLE 2 is blended and heat-pressed in a pair of upper and lower molds each having a hemispherical cavity at 170° C. for 20 minutes, to give a spherical core having a diameter of 41.2 mm.

TABLE 2

| Core rubber composition | Composition (parts by weight) |
|---|---|
| BR01 | 100 |
| Zinc acrylate | 25 |
| Zinc oxide | 20 |
| dicumyl peroxide | 1.2 |

BR01: A polybutadiene rubber manufactured by JSR (cis content: 96% or more)
Zinc acrylate: Trademark: ZNDA-90S, manufactured by Japan Distillation
Zinc oxide: Trademark: Ginrei R, manufactured by Toho Zinc
Dicumyl peroxide: Trademark: Percumyl D, manufactured by NOF Corporation (2) Preparation of Cover Compositions The cover compositions of golf balls of Nos. 1 to 10 and Nos. 13 to 17 shown in Tables 3 to 5 are prepared by mixing the ingredients except the organic peroxide by a kneader and then kneading by a roller into a sheet form, and the mixtures were then once cooled. Subsequently, each of the kneaded mixtures in a sheet form is kneaded again at a temperature in the range of 90 to 110° C. by a roll, and an organic peroxide was added thereto, to give a rubber composition for cover.

The details of the raw materials shown in TABLES 3 to 5 are as follows. The raw materials not shown below are the same as those described in TABLE 2.

RB810: A 1,2-Syndiotactic polybutadiene, manufactured by JSR

TP301: A synthetic trans-polyisoprene, manufactured by Kuraray Co., Ltd.

Butadiene-styrene rubber 1502: A styrene-polybutadiene rubber, manufactured by Zeon Corporation Himilan 1855: A zinc ion-neutralized ethylene-methacrylic acid-acrylic acid ester ternary copolymer ionomer resin, manufactured by Du Pont-Mitsui Polychemicals Co., Ltd.

Himilan 1856: A sodium ion-neutralized ethylene-methacrylic acid-acrylic acid ester ternary copolymer ionomer resin, manufactured by Du Pont-Mitsui Polychemicals Co., Ltd.

Perplene S2001: A thermoplastic polyester elastomer, manufactured by Toyobo Co., Ltd.

(3) Molding of Half Shells

About 6 g of each of the rubber compositions for cover obtained, Nos. 1 to 10 and Nos. 13 to 17, was weighed and pressed by using a lower mold having a concave cavity of 21.54 mm in $R_2$ and an upper mold having a convex dome of 20.64 mm in $R_1$, at the temperature shown in TABLES 3 to 5 for 5 minutes, and additionally for 15 minutes while gradually cooled, to give a half shell having a thickness of 0.8 mm. The core obtained as described above was sandwiched between two half shells thus obtained, and the resulting composite was press-molded at 160 to 170° C. for 15 minutes. The ball thus obtained was marked and coated with a clear paint, to give a golf ball.

To cover composition Nos. 11 and 12, the raw materials shown in TABLE 4 were blended in a biaxial kneading extruder, and the resulting mixture was converted to a pellet-shaped cover composition, which was then directly injection-molded around the core, to give golf balls of Nos. 11 and 12. The extrusion was conducted under the conditions of a screw diameter of 45 mm, a screw rotation number of 200 rpm, and a screw LOD of 35, and the cover compositions were heated at 200 to 260° C. at the dye position of the extruder.

(4) Evaluation Results

Evaluation results of each golf ball thus obtained, including the relationship between the one-hour-half-life temperature of the organic peroxide and the molding temperature of half shell, abrasion resistance, durability, rebound characteristics, controllability, and the like are summarized collectively in TABLES 3 to 5.

TABLE 4

| Golf ball No. | | 8 | 9 | 10 | 11 | 12 |
|---|---|---|---|---|---|---|
| Cover Composition | BR01 | 60 | 60 | 100 | — | — |
| | RB810 | — | — | — | — | — |
| | TP301 | 40 | 40 | — | — | — |
| | SBR1502 | — | — | — | — | — |
| | Zinc oxide | 23.5 | 23.5 | 23.5 | — | — |
| | Titanium oxide | 2 | 2 | 2 | 2 | 2 |
| | Methacrylic acid | 22 | 22 | 22 | — | — |
| | Zinc methacrylate | — | — | — | — | — |
| | Dicumyl peroxide | 0.3 | 8 | 0.5 | — | — |
| | Di-t-butyl peroxide | — | — | — | — | — |
| | Himilan 1855 | — | — | — | 50 | — |
| | Himilan 1856 | — | — | — | 50 | — |
| | Perplene S2001 | — | — | — | — | 100 |
| Production Condition | one-hour-half-life temperature (Ta) of organic peroxide | 136 | 136 | 136 | — | — |
| | Half-shell-molding temperature (Tb) | 110 | 110 | 110 | 160 | 220 |
| | Th = Ta − Tb | 26 | 26 | 26 | — | — |
| | Cover hardness (slab hardness) | 25 | 71 | 52 | 55 | 55 |
| Physical Properties | Abrasion resistance | Δ | Δ | Δ | Δ | X |
| | Durability | 130 | 80 | 95 | 90 | 85 |
| | Rebound characteristics | 96 | 103 | 100 | 98 | 95 |
| | Controllability | Δ | X | Δ | Δ | Δ |

Composition: parts by weight

Golf balls of Nos. 1 to 7 are golf balls obtained by the inventive manufacturing method, and it is clear that these golf balls are superior all in abrasion resistance, durability, rebound characteristics, and controllability. In particular, it is noteworthy that these golf balls are superior in golf ball properties to golf balls of Nos. 11 and 12 having an ionomer cover.

Golf ball of No. 8, which contains excessively fewer organic peroxide relative to the rubber components, showed decrease in abrasion resistance, rebound characteristics, controllability, and the like. Golf ball of No. 9, which contains excessively much organic peroxide relative to the rubber components, showed decrease in abrasion resistance, durability, and controllability. In the case of golf ball of No. 10, which was prepared by using a rubber composition for cover

TABLE 3

| Golf ball No. | | 1 | 2 | 3 | 4 | 5 | 6 | 7 |
|---|---|---|---|---|---|---|---|---|
| Cover Composition | BR01 | — | 60 | 60 | — | 60 | 60 | 60 |
| | RB810 | — | — | 40 | 40 | 40 | 40 | 40 |
| | TP301 | 100 | 40 | — | — | — | — | — |
| | Butadiene-styrene rubber 1502 | — | — | — | 60 | — | — | — |
| | Zinc oxide | 23.5 | 23.5 | 23.5 | 23.5 | — | — | 23.5 |
| | Titanium oxide | 2 | 2 | 2 | 2 | 2 | 2 | 2 |
| | Methacrylic acid | 22 | 22 | 22 | 24 | — | — | 22 |
| | Zinc methacrylate | — | — | — | — | 25 | 17 | — |
| | Dicumyl peroxide | 3 | 5 | 0.5 | 0.5 | 3 | 0.5 | — |
| | Di-t-butyl peroxide | — | — | — | — | — | — | 0.5 |
| | Himilan 1855 | — | — | — | — | — | — | — |
| | Himilan 1856 | — | — | — | — | — | — | — |
| | Perplene S2001 | — | — | — | — | — | — | — |
| Production Condition | one-hour-half-life temperature (Ta) of organic peroxide | 136 | 136 | 136 | 136 | 136 | 136 | 144 |
| | Half-shell-molding temperature (Tb) | 110 | 110 | 110 | 110 | 110 | 110 | 119 |
| | Th = Ta − Tb | 26 | 26 | 26 | 26 | 26 | 26 | 25 |
| | Cover hardness (slab hardness) | 60 | 57 | 63 | 66 | 60 | 49 | 61 |
| Physical Properties | Abrasion resistance | ○ | ○ | ○ | ○ | ○ | ○ | ○ |
| | Durability | 111 | 120 | 105 | 100 | 110 | 125 | 108 |
| | Rebound characteristics | 102 | 101 | 103 | 104 | 102 | 100 | 102 |
| | Controllability | ○ | ○ | ○ | ○ | ○ | ○ | ○ |

Composition: parts by weight containing no crystalline rubber, it was difficult to mold the half shells and prepare golf balls uniform in sphericity and cover thickness, and thus the resulting golf ball was poor in durability.

TABLE 5

| | Golf ball No. | 13 | 14 | 15 | 3 | 16 | 17 |
|---|---|---|---|---|---|---|---|
| Cover | BR01 | 60 | 60 | 60 | 60 | 60 | 60 |
| Composition | RB810 | 40 | 40 | 40 | 40 | 40 | 40 |
| | TP301 | — | — | — | — | — | — |
| | SBR1502 | | — | — | — | — | — |
| | Zinc oxide | 23.5 | 23.5 | 23.5 | 23.5 | 23.5 | 23.5 |
| | Titanium oxide | 2 | 2 | 2 | 2 | 2 | 2 |
| | Methacrylic acid | 22 | 22 | 22 | 22 | 22 | 22 |
| | Zinc methacrylate | | — | — | — | — | — |
| | Dicumyl peroxide | — | 0.5 | 0.5 | 0.5 | 0.5 | 0.5 |
| | Di-t-butyl peroxide | 0.5 | — | — | — | — | — |
| | Himilan 1855 | — | — | — | — | — | — |
| | Himilan 1856 | — | — | — | — | — | — |
| | Perplene S2001 | — | — | — | — | — | — |
| Production Condition | one-hour-half-life temperature (Ta) of organic peroxide | 144 | 136 | 136 | 136 | 136 | 136 |
| | Half-shell-molding temperature (Tb) | 139 | 130 | 120 | 110 | 100 | 90 |
| | Th = Ta − Tb | 5 | 6 | 16 | 26 | 36 | 46 |
| | Cover hardness (slab hardness) | 61 | 63 | 63 | 63 | 63 | 63 |
| Physical | Abrasion resistance | ○ | ○ | ○ | ○ | ○ | ○ |
| Properties | Durability | 25 | 20 | 105 | 105 | 105 | 50 |
| | Rebound characteristics | 102 | 103 | 103 | 103 | 103 | 103 |
| | Controllability | ○ | ○ | ○ | ○ | ○ | ○ |

Composition: parts by weight

The effects of the difference between the one-hour-half-life temperature (Ta) of organic peroxide and the molding temperature (Th) of half shells, Th (=Ta−Th), on the properties of golf balls are summarized in TABLE 5.

Golf balls of Nos. 13 and 14 were prepared at a temperature difference Th of less than 10° C., and golf ball of No. 17 was prepared at a temperature difference Th of over 40° C., and all these golf balls were inferior in durability. On the other hand, it is clear that golf balls No. 15, 3, and 16, which were prepared at a temperature difference Th of 10° C. or more to 40° C. or less, are significantly better in durability than these golf balls. These results indicate that production of golf balls by controlling the difference between the one-hour-half-life temperature (Ta) of the organic peroxide and the molding temperature (Th) of the half shell, Th, in the range of 10 to 40° C. according to the present invention, allows the resulting golf balls with markedly improved durability.

This application is based on Japanese patent application serial No. 2003-322111 filed in Japan Patent Office on Sep. 12, 2003, the contents of which are hereby incorporated by reference.

Although the present invention has been fully described by way of example with reference to the accompanied drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A method for manufacturing a golf ball, comprising the steps of:

forming a core having one or more layers;

preparing a rubber composition by mixing an organic peroxide in a range of more than 0.3 part by weight to 7.5 or less parts by weight with 100 parts by weight of a rubber component which consists of a crystalline rubber present in an amount of 10 weight % or more and a noncrystalline rubber;

forming an uncrosslinked or partially crosslinked half shell by molding the rubber composition at a temperature of 10 to 40° C. lower than the one-hour-half-life temperature of the organic peroxide;

sandwiching the core between two thus-formed half shells so as to keep the thickness of the half shells uniform; and heat-molding the resulting composite to render the half shells into a cover covering the core, wherein the cover has a thickness of 0.3 to 1.2 mm.

2. The method for manufacturing a golf ball according to claim 1, wherein the rubber composition is press-molded for 3 to 10 minutes to form the half shell.

3. The method for manufacturing a golf ball according to claim 1, wherein the half shell is press-molded at 140 to 180° C. for 5 to 20 minutes to form the cover.

4. The method for manufacturing a golf ball according to claim 1, wherein the crystalline rubber includes trans-polyisoprene or 1,2-syndiotactic polybutadiene.

5. The method for manufacturing a golf ball according to claim 4, wherein the half shell is press-molded at 140 to 180° C. for 5 to 20 minutes to form the cover.

6. The method for manufacturing golf balls according to claim 4, wherein the rubber composition is press-molded for 3 to 10 minutes to form the half shell.

7. The method for manufacturing a golf ball according to claim 6, wherein the half shell is press-molded at 140 to 180° C. for 5 to 20 minutes to form the cover.

8. The method for manufacturing a golf ball according to claim 1, wherein the cover has a Shore D hardness of 40 to 68 in a slab state.

9. The method for manufacturing a golf ball according to claim 1, wherein the crystalline rubber is present in an amount of 10 to 40 weight %.

10. The method for manufacturing a golf bail according to claim 1, wherein the crystalline rubber is present in an amount of 30 weight % or more.

11. The method for manufacturing a golf ball according to claim 4, wherein the crystalline rubber is present in an amount of 10 to 40 weight %.

12. The method for manufacturing a golf ball according to claim 1, wherein the crystalline rubber is at least one selected from the group consisting of trans-polyisoprene, nitrile rubber and chloroprene rubber.

* * * * *